(12) United States Patent
Park et al.

(10) Patent No.: US 9,175,722 B1
(45) Date of Patent: Nov. 3, 2015

(54) TOP FOIL FOR FOIL THRUST BEARING AND FOIL THRUST BEARING INCLUDING THE SAME

(71) Applicant: Korea Institute of Energy Research, Daejeon (KR)

(72) Inventors: Byung-Sik Park, Daejeon (KR); Si-Woo Lee, Daejeon (KR); Hyung-Kee Lee, Daejeon (KR); Young-Min Yang, Daejeon (KR); Dong-Hyun Lee, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 14/567,023

(22) Filed: Dec. 11, 2014

(30) Foreign Application Priority Data

Dec. 9, 2014 (KR) ........................ 10-2014-0176029

(51) Int. Cl.
*F16C 32/06* (2006.01)
*F16C 17/04* (2006.01)

(52) U.S. Cl.
CPC .................................. *F16C 17/042* (2013.01)

(58) Field of Classification Search
CPC ....................................................... F16C 17/042
USPC .................................................. 384/105, 106
See application file for complete search history.

(56) References Cited

U.S. PATENT DOCUMENTS 4,082,375 A * 4/1978 Fortmann ..................... 384/105
4,462,700 A * 7/1984 Agrawal ...................... 384/105

FOREIGN PATENT DOCUMENTS

FR 3001779 A1 * 8/2014

* cited by examiner

*Primary Examiner* — Phillip A Johnson
(74) *Attorney, Agent, or Firm* — Patent Office of Dr. Chung Park

(57) ABSTRACT

There is disclosed a top foil for a foil thrust bearing including a main plate, a first hook comprising a first vertical portion bend upwardly from an end of the main plate and a first horizontal portion bend forwardly from an end of the first vertical portion, and a second hook comprising a second vertical portion bend downwardly from a rear end of the main plate and a second horizontal portion bend backwardly from an end of the second vertical portion.

11 Claims, 5 Drawing Sheets

TOP FOIL FOR FOIL THRUST BEARING AND FOIL THRUST BEARING INCLUDING THE SAME

CROSS-REFERENCE TO RELATED APPLICATION

This application claims priority under 35 U.S.C. §119 from Korean Application No. 10-2014-0176029 filed on Dec. 9, 2014, the subject matter of which is incorporated herein by reference.

TECHNICAL FIELD

Embodiments of the disclosure relate to a top foil for a bearing thrust bearing and a foil thrust bearing including the same, more particularly, to a top foil for a foil thrust bearing which can be molded easily, to enhance a supporting force and durability of the bearing.

BACKGROUND

Generally, thrust is generated in a rotary turbine and a foil thrust bearing is broadly used to support and suspend the thrust.

Such a foil thrust bearing consists of a bearing base plate, a top foil for making fluid layer, in contact with a rotary turbine structure, and a bump foil for keeping a whole baring profile.

At this time, the most important element composing the foil thrust bearing is the top foil. The structure for fixing the top foil to the base plate and the profile of the top foil are the most important.

Especially, unless the profile of the top foil is kept properly, the whole supporting force of the bearing might be reduced and abrasion occurs in the bearing to shorten a usage life of the bearing. The process of molding the profile of the top foil is critically important for the foil thrust bearing to secure a sufficient supporting force.

Such the molding process of the top foil has to be processed in accordance with a precisely designed curvature, such that the molding process can be disadvantageously difficult and complex.

In addition, a corresponding mold is required based on the size of each bearing and one corresponding mold has to be fabricated in accordance with a volume of a turbine structure, which might cause the increased cost and time taken by the bearing manufacture.

The plurality of the top foils may be secured to the base plate, respectively. In case one of the top foils is separated, the whole supporting force of the bearing might be reduced. In severe cases, there might be damage to the bearing.

DISCLOSURE

Technical Problem

To solve the problems, exemplary embodiments of the disclosure provide a top foil for a foil thrust bearing which can be molded easily, to enhance a supporting force and durability of the bearing.

Additional advantages, objects, and features of the invention will be set forth in part in the description which follows and in part will become apparent to those having ordinary skill in the art upon examination of the following or may be learned from practice of the invention.

Technical Solution

To achieve these objects and other advantages and in accordance with the purpose of the embodiments, as embodied and broadly described herein, a top foil for a foil thrust bearing includes a main plate; a first hook comprising a first vertical portion bend upwardly from an end of the main plate and a first horizontal portion bend forwardly from an end of the first vertical portion; and a second hook comprising a second vertical portion bend downwardly from a rear end of the main plate and a second horizontal portion bend backwardly from an end of the second vertical portion.

The main plate may be formed of an elastic material to be transformed by an external force.

Exemplary embodiments of the present disclosure may also provide a foil thrust bearing including a base plate; and a plurality of top foils having a predetermined number of top foils coupled to each other to contact with the base plate partially, wherein a rear end of one top foil is fixedly overlapped with a front end of a neighboring top foil.

The top foil may include a main plate; and a first hook comprising a first vertical portion bend upwardly from a front end of the main plate and a first horizontal portion bend forwardly from an end of the first vertical portion, and the first horizontal portion is overlapped with a rear end of a neighboring top foil.

The top foil may include a main plate; and a second hook comprising a second vertical portion bend downwardly from a rear end of the main plate and a second horizontal portion bend backwardly from an end of the second vertical portion, and the second horizontal portion may be overlapped with a front end of a neighboring top foil.

The top foil may include a main plate; a first hook comprising a first vertical portion bend upwardly from an end of the main plate and a first horizontal portion bend forwardly from an end of the first vertical portion; and a second hook comprising a second vertical portion bend downwardly from a rear end of the main plate and a second horizontal portion bend backwardly from an end of the second vertical portion.

The main plate may be formed of an elastic material to be transformed by an external force.

The foil thrust bearing may further include a bump foil for supporting the top foil.

Advantageous Effects

The embodiments have following advantageous effects.

First, the curvature for generating a pressure of the foil thrust bearing may be formed naturally. Accordingly, the abrasion of the bearing can be reduced.

Second, the top foil is may be fixed stably. Accordingly, damage and abrasion caused by separation of the top foil is prevented effectively.

Third, the molding processes of the top foil may be reduced. Accordingly, the cost and time required to manufacture the bearing may be reduced.

The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the disclosed subject matter and are incorporated in and constitute a part of this specification, illustrate exemplary embodiments of the disclosed subject matter, and together with the description serve to explain the principles of the disclosed subject matter.

BEST MODE

Hereinafter, exemplary embodiments of the present invention will be described in detail with reference to the accompanying drawings. However, in the description of the present invention, a description of a function or a configuration, which has been already publicly known, will be omitted in order to make clear the subject matter of the present invention.

The terminology used herein used to indicate a direction "forward/backward" or "upward/downward" is for the purpose of describing exemplary embodiments only and is not intended to be limiting of the disclosed subject matter.

First Embodiment

Figure 1:
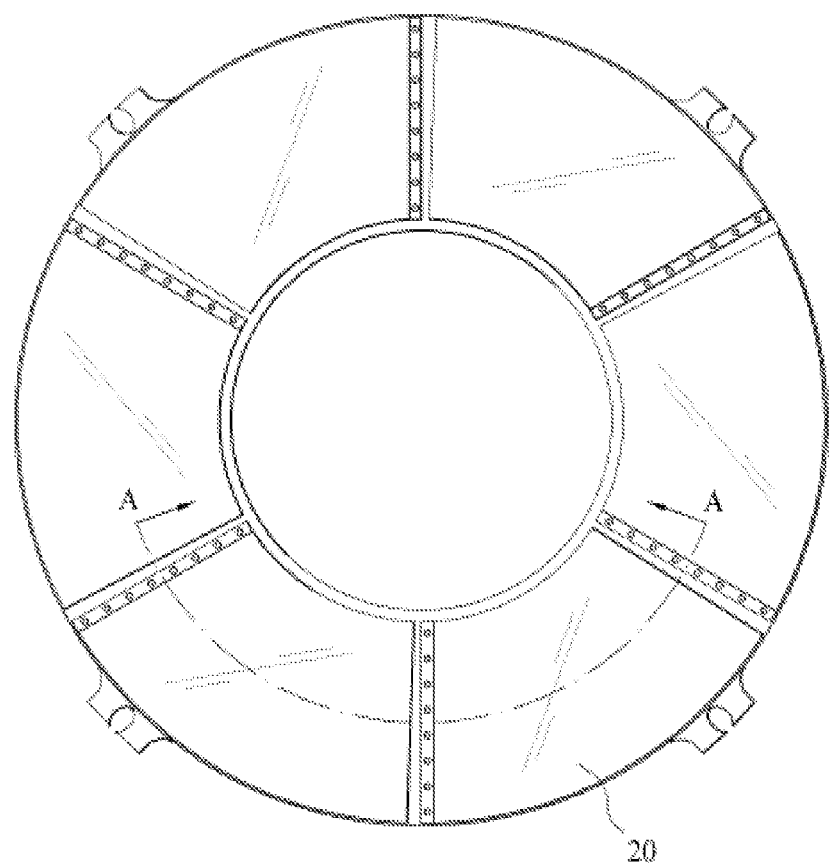
FIG. 1 is a front view illustrating a conventional foil thrust bearing.
Figure 2:
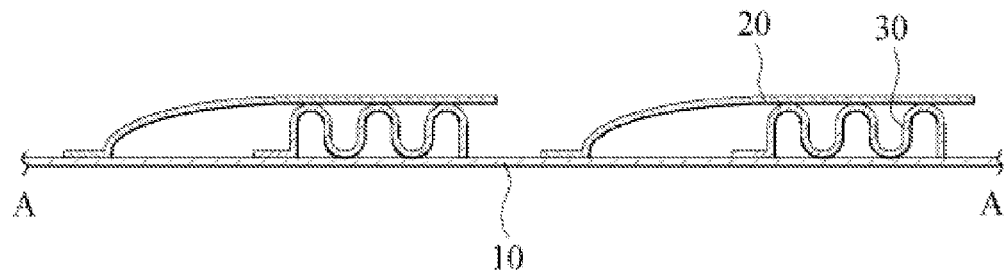
FIG. 2 is a sectional diagram illustrating a A-A area of FIG. 1.
Figure 3:
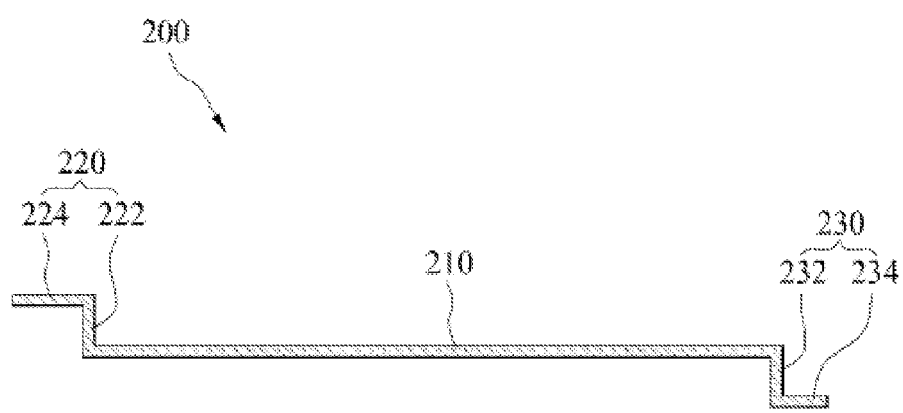
FIG. 3 is a diagram illustrating a top foil for a foil thrust bearing in accordance with the present disclosure.
Figure 4:
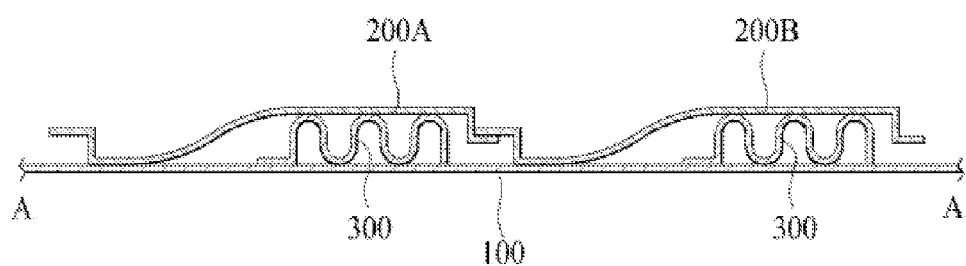
FIG. 4 is a diagram illustrating a first embodiment of the foil thrust bearing in accordance with the present disclosure.

Referring to FIGS. 3 and 4, a structure of the first embodiment of the foil thrust bearing in accordance with the present disclosure will be described in detail.

FIG. 3 is a diagram illustrating a top foil for a foil thrust bearing in accordance with the present disclosure. FIG. 4 is a diagram illustrating a first embodiment of the foil thrust bearing in accordance with the present disclosure.

As shown in FIGS. 3 and 4, the first embodiment of the foil thrust bearing in accordance with the present disclosure may include a base plate 100 and a top foil 200.

The base plate 100 is a surface where the foil thrust bearing is formed in a turbine structure. A surface of the base plate 100 perpendicular to the turbine structure may face a predetermined portion of a rotary unit, in contact.

Such the base plate 100 is the surface formed in a traverse direction with respect to the thrust generated in the turbine structure and a shape and a structure of the base plate 100 may be limited. Accordingly, the base plate 100 may be formed in various shapes and structures.

Meanwhile, the top foil 200 consists of a plurality of plates in contact with the base plate partially. A rear end of one top foil 200 is fixedly overlapped with a front end of another top foil 200 adjacent to the top foil 200.

Specifically, the top foil 200 in this embodiment may include a main plate 210, a first hook 220 and a second hook 230.

The main plate 210 defines a body of the top foil 200 and it has a corresponding area to the foil structure of the thrust foil bearing in accordance with the present disclosure.

The first hook 220 may include a first vertical portion 222 bent upwardly from a front end of the main plate 210 mentioned above and a first horizontal portion 224 bent forwardly from an end of the first vertical portion 222.

In other words, when a plurality of foils are arranged to surround a shaft in the thrust bearing, the first hook 220 formed in the front end of the main plate 210 may be overlapped with a rear end of a neighboring foil arranged in the front end of the main plate 210.

It is shown that the first vertical portion 222 and the first horizontal portion 224 in this embodiment are arranged vertically and horizontally, respectively, in the drawing. That is one of applicable embodiments, not limited to the names and drawings described herewith. They may be formed at diverse angles and the shapes and structures are diversified, not limited thereto.

The second hook 230 may include a second vertical portion 232 bent downwardly from a rear end of the main plate 210 mentioned above and a second horizontal portion 234 bent backwardly from one end of the second vertical portion 232.

In other words, the second hook 230 formed in the rear end of the main plate 210 may be overlapped with a front end of a neighboring foil arranged in a rear end of the second hook 230.

Similar to the first vertical portion 222 and the first horizontal portion 232 mentioned above, it is shown that the second vertical portion 232 and the second horizontal portion 234 in this embodiment are arranged vertically and horizontally, respectively, in the drawing. That is one of applicable embodiments, not limited to the names and drawings described herewith. They may be formed at diverse angles and the shapes and structures are diversified, not limited thereto.

In such the structure, the plurality of the top foils of the thrust bearing in this embodiment may be arranged to surround the shaft. The second hook 230 formed in the rear end of one top foil 200a arranged in the front end of the thrust bearing is fixedly overlapped with the first hook 220 formed in the front end of the next top foil 200B arranged in the rear end of the thrust bearing.

The plurality of the top foils 200 coupled to each other in such the arrangement structure may connectedly surround the shaft, such that the whole thrust bearing can be arranged stably.

Meanwhile, the base plate 210 of the top foil 200 may be formed of an elastic material to be transformed by an external force.

When molding the top foil 200, the cost and time taken to molding the curvature may be reduced effectively in such the structure. Such the structure may be advantageous in manufacturing diverse sizes and shapes of top foils 200.

In the top foil 200 in accordance of the present disclosure, a predetermined portion of a front end of the main plate 210 is coupled to the based plate 100 mentioned above and a rear end of the main plate 210 is spaced apart a predetermined distance from the main plate 210 such that a natural curvature may be formed.

The rear end of the main plate 210 spaced a predetermined distance apart from the base plate 100 is fixed by the first hook 220 of another top foil 200 arranged in the rear end, to keep the distance.

At this time, the foil thrust bearing in accordance with the present disclosure may further include a bump foil 300 provided between the base plate 100 and the top foil 200 to support the top foil 200, with keeping the distance between the base plate 100 and the top foil 200.

The bump foil 300 is advantageously useful in the top foil 200 keeping the shape more stably. The shape of the bump foil 300 may be predetermined based on an ideal shape of the top foil 200.

Only when the bump foil 300 may be coupled to the base plate 100 to support the top foil 200 with a rear end of the top foil 200 being spaced apart from the base plate 100 stably, the bump foil 300 may be formed of diverse kinds of materials in diverse shapes, not limited to this embodiment.

The first embodiment of the thrust bearing in accordance with the present disclosure with the structure mentioned above may naturally form the curvature for generating a pressure of the foil thrust bearing, such that the time and cost of the top foil 200 can be reduced effectively.

In addition, the abrasion of the bearing caused by the molding fault of the curvature and the abrasion of the bearing caused by the separation of the top foil 200 may be minimized. Accordingly, the load performance and durability performance of the bearing can be increased effectively.

The plurality of the top foils 200 may be fixedly coupled to each other, such that the damage to the bearing caused by the separation of the top foil 200 can be prevented effectively.

Second Embodiment

Referring to FIGS. 5 through 8, a structure of a second embodiment of the foil thrust in accordance with the present disclosure will be described in detail.

Figure 5:
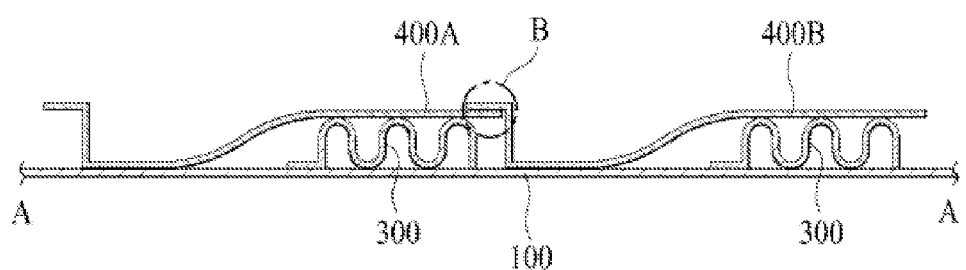
FIG. 5 is a diagram illustrating a second embodiment of the foil thrust bearing in accordance with the present disclosure.

At this time, FIG. 5 is a diagram illustrating a second embodiment of the foil thrust bearing in accordance with the present disclosure.

Figure 6:
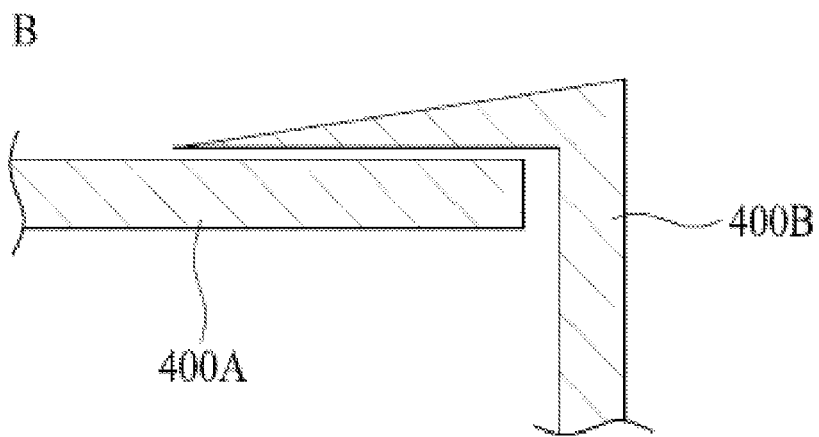
FIG. 6 is a diagram illustrating a first variation example of the second embodiment of the foil thrust bearing in accordance with the present disclosure.
Figure 7:
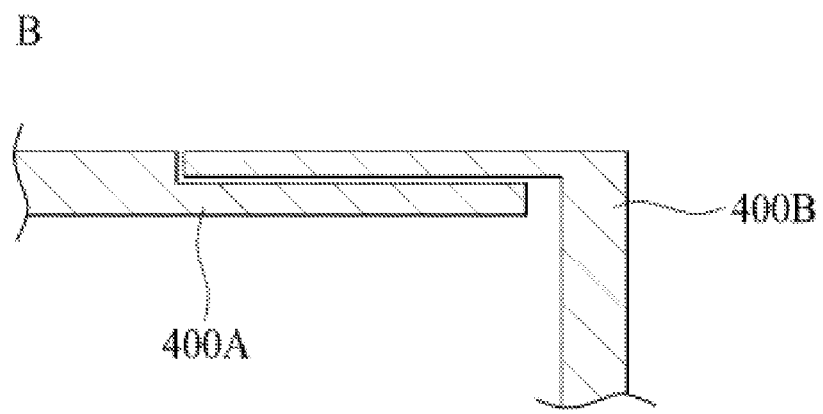
FIG. 7 is a diagram illustrating a second variation example of the second embodiment of the foil thrust bearing in accordance with the present disclosure.
Figure 8:
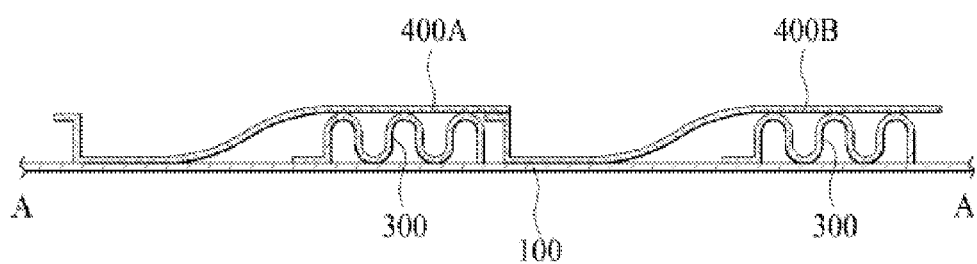
FIG. 8 is a third variation example of the second embodiment of the foil thrust bearing in accordance with the present disclosure.

FIG. 6 is a diagram illustrating a first variation example of the second embodiment of the foil thrust bearing in accordance with the present disclosure. FIG. 7 is a diagram illustrating a second variation example of the second embodiment of the foil thrust bearing in accordance with the present disclosure. FIG. 8 is a third variation example of the second embodiment of the foil thrust bearing in accordance with the present disclosure.

As shown in FIG. 5, the second embodiment of the foil thrust bearing in accordance with the present disclosure may include a base plate 100, a top foil 400 and a bump foil 300.

The base plate 100 and the bump foil 300 are equal to the base plate 100 and the bump foil 300 mentioned above in the first embodiment, and then detailed description of those elements will be omitted.

A structure of the top foil 400 in this embodiment is basically equal to the structure of the top foil 400 in the first embodiment mentioned above, except a hook formed only in the front end of the main plate.

In this instance, as shown in FIG. 5, s hook formed in a front end of a top foil 400B may be projected as far as a distance between the base plate 100 and a rear end of another top foil 400A formed in the front end spaced apart from each other. Accordingly, the hook may be fixedly overlapped with a rear end of the top foil 400A formed in the front end.

In the second embodiment of the foil thrust bearing, the structure of the top foil 400 may be simpler and manufacture processes of the top foil 400 can be reduced. The time and cost required to manufacture the top foil 400 may be reduced more effectively.

Meanwhile, as shown in FIGS. 6 through 8, the second embodiment of the thrust bearing in accordance with the present disclosure may include a variation example of the coupling structure between neighboring top foils 400.

First of all, in a first variation example, the hook of the top foil 400B arranged in the rear end is inclined. When the hook is overlapped with the rear end of the top foil 400A arranged in the rear end, no steps may be formed.

Also, in the second embodiment, a groove corresponding to the hook of the top foil 400B arranged in the rear end may be formed in the rear end of the top foil 400A arranged in the front end.

In other words, when the top foil 400A formed in the front end is overlapped with the hook of the top foil 400B formed in the rear end, a top surface of the top foil 400 may be even.

Also, in the third embodiment, a hook formed in the front end of the top foil 400A may be overlapped with a lower portion of a rear end of another top foil 400A, contrast to being fixedly overlapped with an upper portion of the rear end of another top foil 400A, to be coupled by an auxiliary fixing process.

In the variation examples of the second embodiment of the foil thrust bearing in accordance with the present disclosure, a surface of the top foil formed in the foil thrust in contact with the rotary unit may be formed relatively uniform. Accordingly, an effect of reducing elements interfering in the rotation of the rotary unit can be achieved.

Also, the damage to the foil thrust bearing in accordance with the present disclosure, which might be caused by the rotation of the rotary unit, may be prevented effectively.

Third Embodiment

Figure 9:
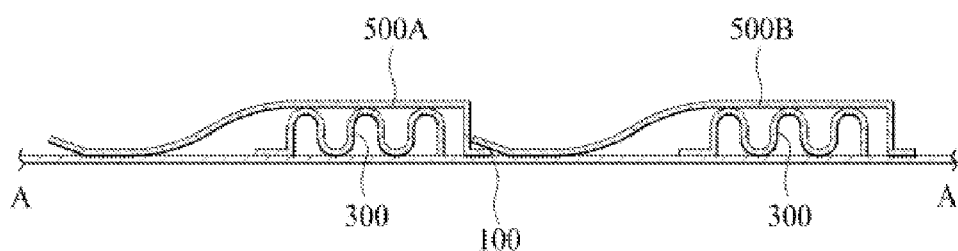
FIG. 9 is a diagram illustrating a third embodiment of the foil thrust bearing in accordance with the present disclosure.

Referring to FIG. 9, a structure of the third embodiment of the foil thrust bearing in accordance with the present disclosure will be described in detail.

FIG. 9 is a diagram illustrating a third embodiment of the foil thrust bearing in accordance with the present disclosure.

As shown in FIG. 9, the third embodiment of the foil thrust bearing in accordance with the present disclosure may include a base plate 100, a top foil 500 and a bump foil 300.

The base plate 100 and the bump foil 300 are equal to the base plate 100 and the bump foil 300 of the first and second embodiments, and detailed description of those elements will be omitted accordingly.

The top foil 500 in this embodiment is basically equal to the top foil 200 of the third embodiment and the top foil 400 of the second embodiment mentioned above. However, the top foil 500 in this embodiment may have a hook formed only in a rear end of the main plate.

In this instance, the hook formed in the rear end of the top foil 500A shown in FIG. 9 may be projected as far as a distance between the rear end of the top foil 500A and the base plate 100, to be fixedly coupled to a front end of another top foil 500B formed in a rear end.

At this time, when a predetermined portion of the front end of the top foil 500 is coupled to the base plate 100, there may be a predetermined front end portion of the coupled portion, which is not coupled to the base plate 100.

In this embodiment, the hook formed in the rear end of the top foil 500A is fixedly overlapped with a lower portion of a front end of another top foil 500B.

Alternatively, the hook may be overlapped with an upper portion of a front end of another top foil 500B to be coupled by an auxiliary coupling process.

The second embodiment of the foil thrust bearing in accordance with the present disclosure may simplify the structure of the top foil 500, such that manufacturing processes of the top foil 500 can be reduced more and that the time and cost required to manufacture the top foil can be reduced.

The hook formed in the rear end of the top foil 500 may support the rear end of the top foil 500, with a distance spaced apart from the base plate 100, only to keep the structure of the whole thrust bearing more stably.

Accordingly, the bump foil 300 may be omitted. In this instance, manufacturing processes of the foil thrust bearing may be simplified and the cost and time required to manufacture the thrust bearing may be reduced.

While the specific exemplary embodiments of the present invention have been described above and illustrated, it is apparent to those skilled in the art that the present invention is not limited to the disclosed exemplary embodiment, and various modifications and alterations may be made without departing from the spirit and the scope of the present invention. Therefore, the modifications or the alterations should not be appreciated individually from the technical spirit or the prospect of the present invention, and the modified exemplary embodiments belong to the scope of the claims of the present invention.

The invention claimed is:

1. A top foil for a foil thrust bearing comprising:
   a main plate;
   a first hook comprising a first vertical portion bend upwardly from an end of the main plate and a first horizontal portion bend forwardly from an end of the first vertical portion; and
   a second hook comprising a second vertical portion bend downwardly from a rear end of the main plate and a second horizontal portion bend backwardly from an end of the second vertical portion.

2. The top foil for the foil thrust bearing of claim 1, wherein the main plate is formed of an elastic material to be transformed by an external shock.

3. A foil thrust bearing comprising:
   a base plate; and
   a plurality of top foils having a predetermined number of top foils coupled to each other to contact with the base plate partially,
   wherein a rear end of one top foil is fixedly overlapped with a front end of a neighboring top foil.

4. The foil thrust bearing of claim 3, wherein the top foil comprises,
   a main plate; and
   a first hook comprising a first vertical portion bend upwardly from a front end of the main plate and a first horizontal portion bend forwardly from an end of the first vertical portion, and
   the first horizontal portion is overlapped with a rear end of a neighboring top foil.

5. The foil thrust bearing of claim 4, wherein the main plate is formed of an elastic material to be transformed by an external force.

6. The foil thrust bearing of claim 3, wherein the top foil comprises,
   a main plate; and
   a second hook comprising a second vertical portion bend downwardly from a rear end of the main plate and a second horizontal portion bend backwardly from an end of the second vertical portion, and
   the second horizontal portion is overlapped with a front end of a neighboring top foil.

7. The foil thrust bearing of claim 6, wherein the main plate is formed of an elastic material to be transformed by an external force.

8. The foil thrust bearing of claim 3, wherein the top foil comprises,
   a main plate; and
   a first hook comprising a first vertical portion bend upwardly from an end of the main plate and a first horizontal portion bend forwardly from an end of the first vertical portion; and
   a second hook comprising a second vertical portion bend downwardly from a rear end of the main plate and a second horizontal portion bend backwardly from an end of the second vertical portion.

9. The foil thrust bearing of claim 8, wherein the main plate is formed of an elastic material to be transformed by an external force.

10. The foil thrust bearing of claim 3, wherein the main plate is formed of an elastic material to be transformed by an external force.

11. The foil thrust bearing of claim 3, further comprising:
    a bump foil for supporting the top foil.

* * * * *